United States Patent
Kavana

[11] Patent Number: 5,867,387
[45] Date of Patent: Feb. 2, 1999

[54] METHOD FOR SIZING AND DISTRIBUTING AUTOMOTIVE VEHICLE COMPONENTS

[75] Inventor: Joseph Kavana, Miami, Fla.

[73] Assignee: Sagaz Industries, Inc., Miami, Fla.

[21] Appl. No.: 772,020

[22] Filed: Dec. 19, 1996

[51] Int. Cl.[6] .................................................. G06F 19/00
[52] U.S. Cl. ............................ 364/468.03; 364/470.01; 364/468.13
[58] Field of Search .................. 364/470.01, 470.02, 364/470.03, 468.03, 468.04, 468.13, 468.14, 468.24, 468.01, 474.05, 474.24, 512, 578; 705/28, 29, 26, 27; 345/962, 964, 965, 968; 701/1

[56] References Cited

U.S. PATENT DOCUMENTS

| | | | |
|---|---|---|---|
| 4,972,351 | 11/1990 | Reger et al. | 364/468.25 |
| 5,267,146 | 11/1993 | Shimizu et al. | 364/512 |
| 5,309,366 | 5/1994 | Grenkowitz | 364/474.24 |
| 5,359,523 | 10/1994 | Talbott et al. | 364/468.03 |

*Primary Examiner*—Joseph Ruggiero
*Attorney, Agent, or Firm*—Howard & Howard

[57] ABSTRACT

A method of sizing and distributing automotive seat covers. The method includes creating a data base of different seat configurations installed as original equipment by the manufacturer in each model of various vehicle makes and developing a minimum number of seat cover patterns with a seat cover fabricated from each pattern designated as a predetermined size and designed to fit a plurality of the different seat configurations.

A selection data base is created assigning each of the seat configurations to a predetermined size of seat cover and a plurality of seat covers are fabricated in each predetermined size in an array of different colors and fabrics. A screen display is presented on a monitor portraying the various seat configurations installed as original equipment by the manufacturer and requesting a selection of one of the various seat configurations portrayed on the monitor. A seat cover size is then presented on the monitor from the selection data base in response to the selection of one of the various seat configurations. Next to the monitor are shelves of boxes of seat covers with each box marked with one of the predetermined sizes. The boxes are of one of two types, the library type with varying frontal sizes and various depths, and the shoebox type with constant frontal sizes but varying depths.

17 Claims, 4 Drawing Sheets

METHOD FOR SIZING AND DISTRIBUTING AUTOMOTIVE VEHICLE COMPONENTS

TECHNICAL FIELD

The subject invention relates to the sizing and distributing of automotive components which vary in configuration from model to model of vehicle.

BACKGROUND OF THE INVENTION

For many years automotive vehicles had similar interior configurations and components such as seat covers, floor mats, seat cushions, cargo liners, and the like, were limited in shapes and sizes. In the case of seat covers, it was possible to produce seat covers with a certain amount of stretch to fit a significant portion of the vehicle seats. However, in recent years the makes and models of vehicles have not only become more numerous but also the interiors have become more distinctive and diverse even in the same models. In addition, vehicles are kept long enough by some owners to wear seat covers, mats, or the like, sufficiently to be replaced.

The requirements for aftermarket components of this type is that they fit, are of original equipment type material and are easy to install.

In order to meet these needs, suppliers have custom made the components in response to specific orders. The major drawback has been the weeks it takes for delivery. There remains a need for a system to provide retail available components of high quality material and which fit with easy installation.

SUMMARY OF THE INVENTION AND ADVANTAGES

A method of sizing and distributing an automotive component which varies in configuration from model to model of vehicle. The method comprises the steps of creating a data base of the different configurations of the component installed as original equipment by the manufacturer in each model of various vehicle makes and developing a minimum number of component patterns with a component fabricated from each pattern designed to fit a group of the different component configurations and designated as a predetermined size for that group with different component patterns producing components fitting different groups. This is followed by creating a selection data base assigning each of the component configurations to a predetermined size of component and fabricating a plurality of components in each predetermined size. The method continues at the point of purchase by presenting a screen display on a monitor portraying the various component configurations installed as original equipment by the manufacturer and requesting a selection of one of the various component configurations portrayed on the monitor. The final step is presenting a component size on the monitor from the selection data base in response to the selection of one of the various component configurations.

The invention also includes an assembly for distributing an automotive component which varies in configuration from model to model of vehicle and comprising a computer having an input, a monitor output and a memory connection. A monitor is connected to the monitor output for presenting various screen displays and a memory is connected to the memory connection for storing various seat configurations installed as original equipment by the manufacturer in each model of various vehicle makes and assigning each of the seat configurations to a predetermined size of seat cover. A selection device is connected to the input for inputting selection signals to the computer in response to monitor presentations to select a specific seat configuration.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
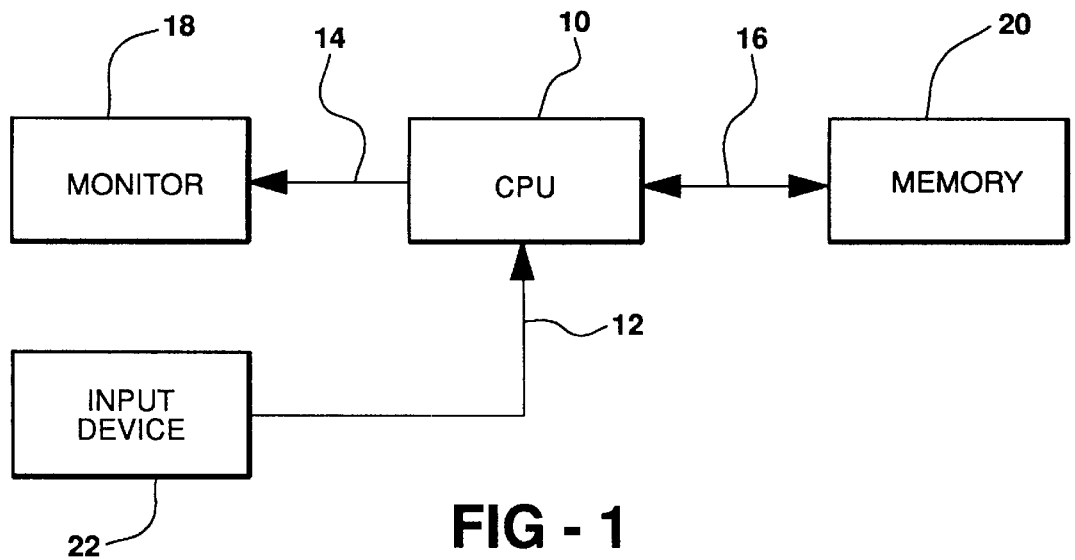
FIG. 1 is a schematic of the assembly used to implement the invention.

Referring to the Figures, wherein like numerals indicate like or corresponding parts throughout the several views, an assembly used in the distribution of an automotive component which varies in configuration from model to model of vehicle is schematically shown in FIG. 1. The assembly comprises a computer or central processing unit (CPU) 10 having an input 12, a monitor output 14 and a memory connection 16. A monitor 18 is connected to the monitor output 14 for presenting various screen displays, some of which are illustrated in FIGS. 2 through 5. The computer 10 as used herein could comprise a dedicated chip with a circuit or a compact disc player with the memory on a compact disc. A liquid crystal display could be used or a computer monitor.

Figure 4:
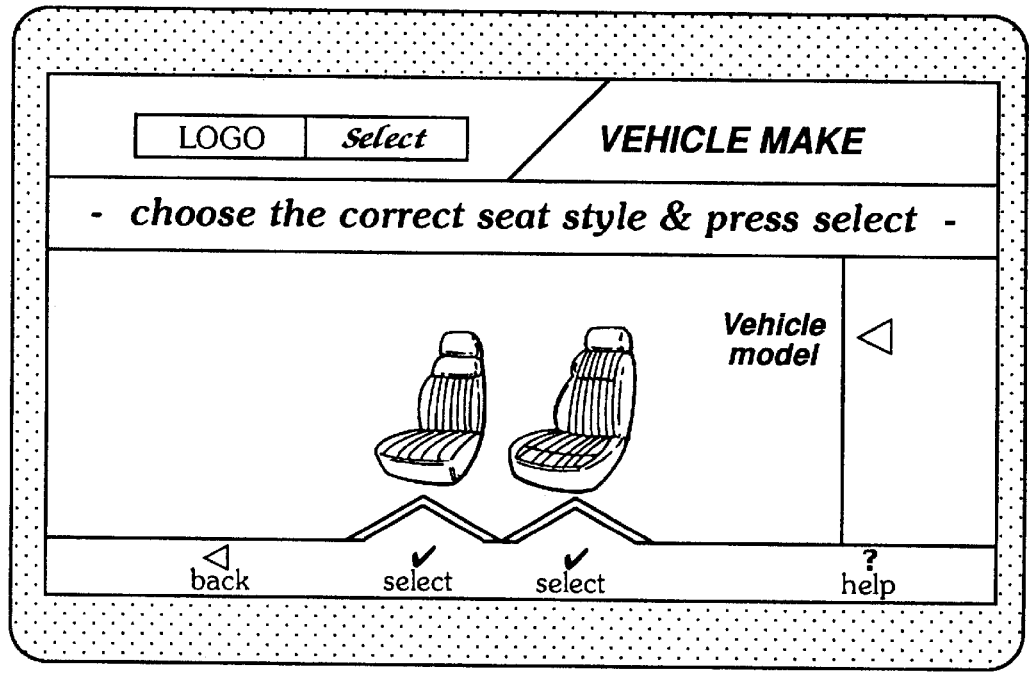
FIG. 4 is a view of a monitor screen used to select component configuration.
Figure 5:
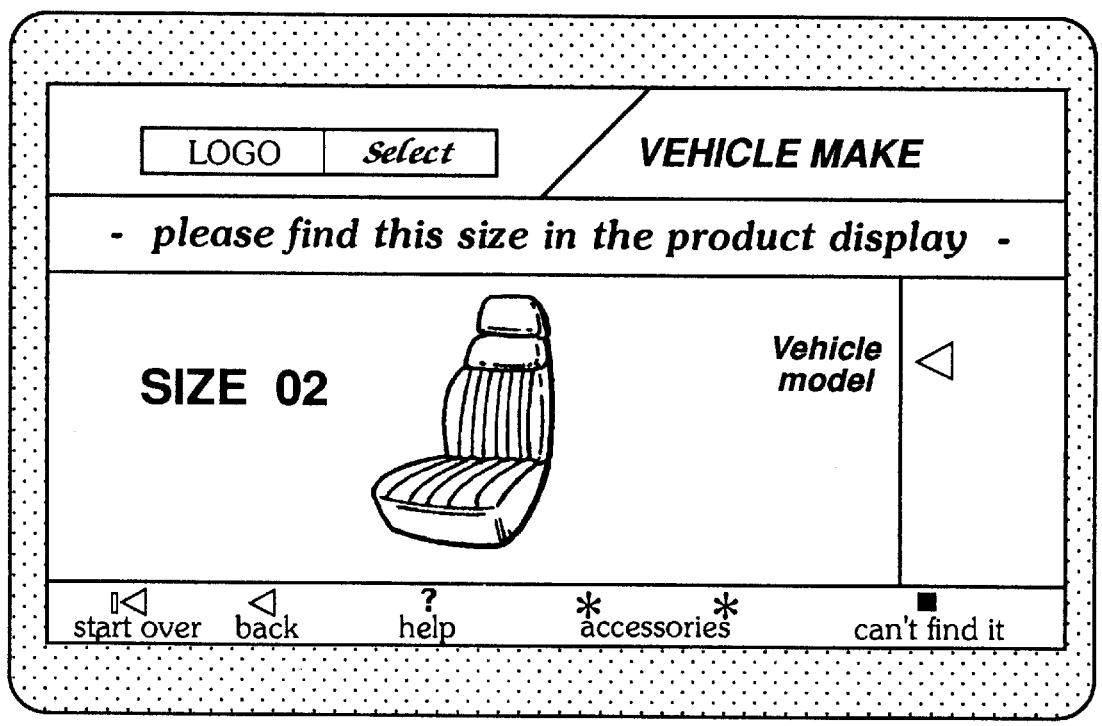
FIG. 5 is a view of a monitor screen used to present size.

A memory 20 is connected to the memory connection 16 for storing various seat configurations installed as original equipment by the manufacturer in each model of various vehicle makes with each of the seat configurations assigned to a predetermined size of seat cover. A selection or input device 22 is connected to the input 12 for inputting selection signals to the computer 10 in response to monitor presentations to select a specific seat configuration. In other words, the computer 10 stores a first screen for display on the monitor 18 to request a selection of the make of vehicle, an example of such a screen being shown in FIG. 2. Normally, buttons would be positioned below the screen of the monitor 18 for actuation to move through the series of screens. The screen could also be touched at the selection point to move from screen to screen. If more than one product, e.g., seat covers and floor mats, are sold at the same display the first screen would present a selection of products or components. Thereafter the operator would select the make of vehicle from a list presented on the monitor 18. Once the operator has selected the make of vehicle, the monitor 18 displays a second screen, as illustrated in FIG. 3, requesting the model, which is stored in the computer 10. The computer 10 also stores a third screen for display on the monitor requesting the seat configuration as illustrated in FIG. 4. The computer 10 stores a fourth screen for display on the monitor, as illustrated in FIG. 5, presenting a seat cover size in response to the selection of the seat configuration.

Figure 6:
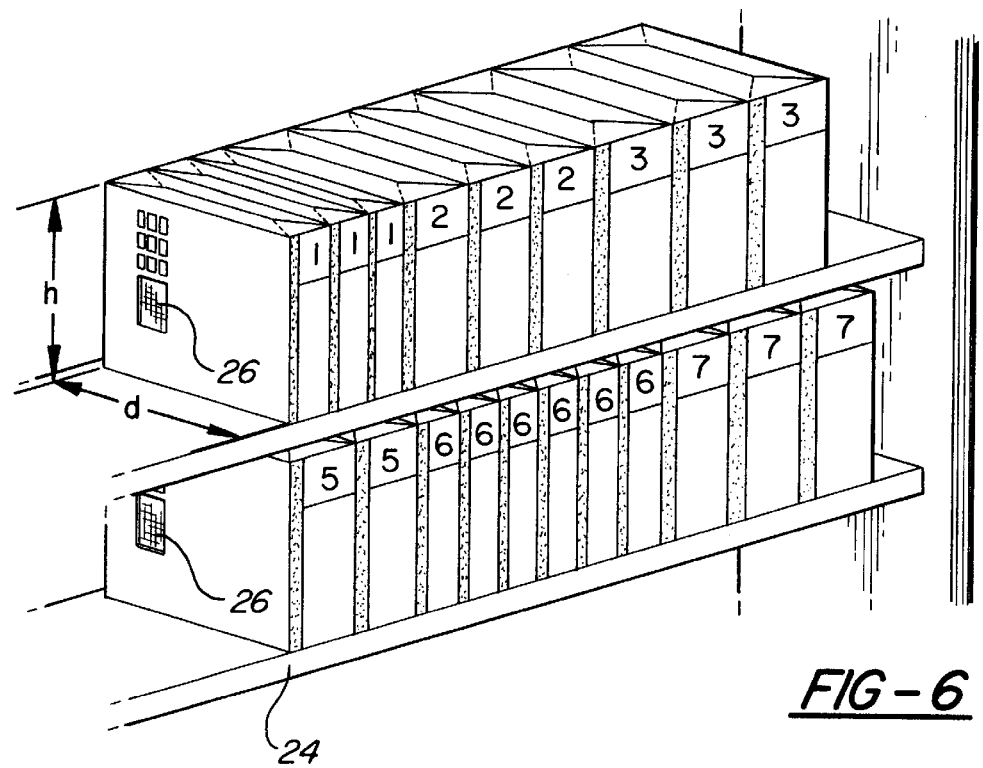
FIG. 6 is a view showing the sales display with a box of a first configuration.
Figure 7:
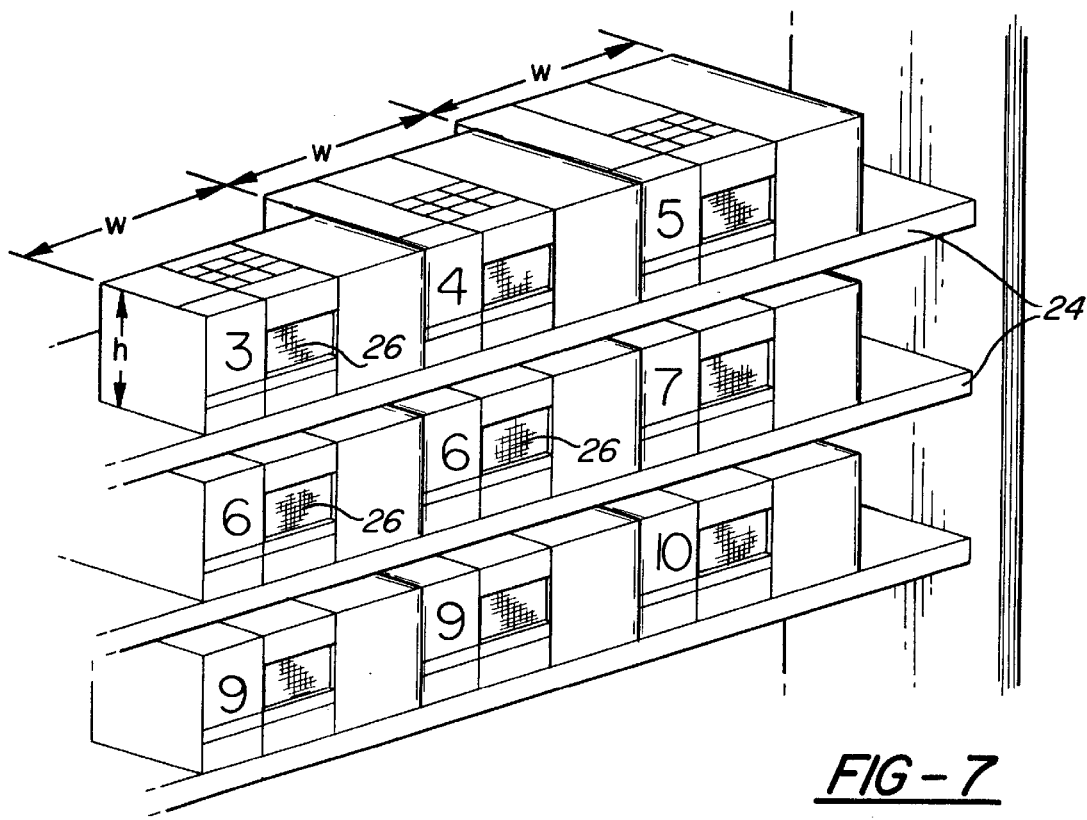
FIG. 7 is a view showing the sales display with a box of a second configuration.

The point of purchase, at which the computer 10, monitor 18, the memory 20 and input device 22 or selection buttons are located, also includes shelves and boxes disposed on the shelves 24, as illustrated in FIGS. 6 and 7. The boxes are of a plurality of different volumes with all of the boxes presenting the identical rectangular shape on one side and varying in distance from the rectangular side to vary the volume from box to box for packaging seat covers of various different sizes; each of the boxes having indicia indicating size thereon. The first type of boxes are shown in FIG. 6 and are of the library presentation with a common height (h) and depth (d) (i.e., the identical rectangular shape) but vary in width along the shelves. Each width has a different size number thereon as indicated from sizes 1 to 7. The second type is of the shoe box presentation and are shown in FIG. 7 to have a common height (h) and width (w) (i.e., the identical rectangular shape) along the shelves 24 but vary in depth into the shelves (i.e., perpendicular to the front edge of the shelves 24). Each of the boxes has an opening 26 for viewing and touching the seat cover material disposed in the box.

The invention therefore includes the method of packaging and distributing automotive seat covers. The first step comprises creating a data base of different seat configurations installed as original equipment by the manufacturer in each model of various vehicle makes. From this the next step comprises developing a minimum number of seat cover patterns with a seat cover fabricated from each pattern designated as a predetermined size and designed to fit a plurality of the different seat configurations. A selection data base is then created assigning each of the seat configurations to a predetermined size of seat cover.

A plurality of seat covers are fabricated in each predetermined size in an array of different colors and fabrics. The boxes are provided with a plurality of different volumes and all presenting the identical rectangular shape on one side and varying in distance from the rectangular side to vary the volume from box to box for packaging seat covers of various different sizes. In other words, the seat covers are boxed or packaged in the library type boxes of FIG. 6, with identical rectangular sides extending into the shelves, or the shoebox type of FIG. 7, with identical rectangular fronts along the shelves. Each predetermined size of seat cover is packaged in one of the boxes dependent upon the volume of the folded seat cover.

The method also includes creating a geographical data base of numbers of vehicle models in a predetermined geographical area. For example, a database could be created for southeast Florida to determine the numbers of each make and model of vehicle registered in that geographical area. A retail outlet in the predetermined geographical area would then be stocked with the number of each predetermined size of seat cover being proportional to the number of vehicle models in the geographical area as determined from the geographical data base.

Figure 2:
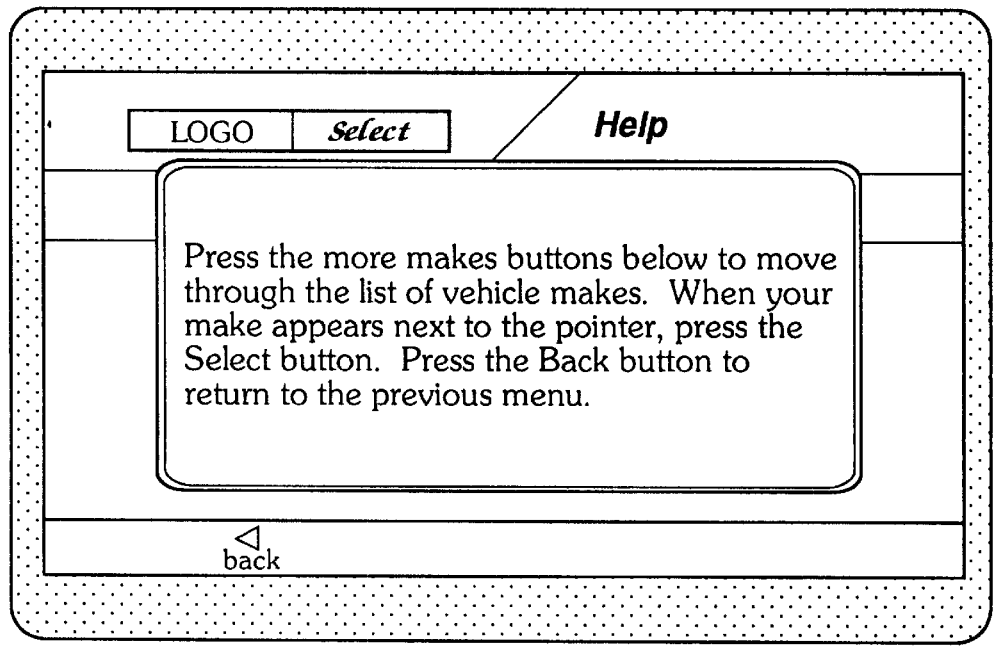
FIG. 2 is a view of a monitor screen used to select vehicle make.
Figure 3:
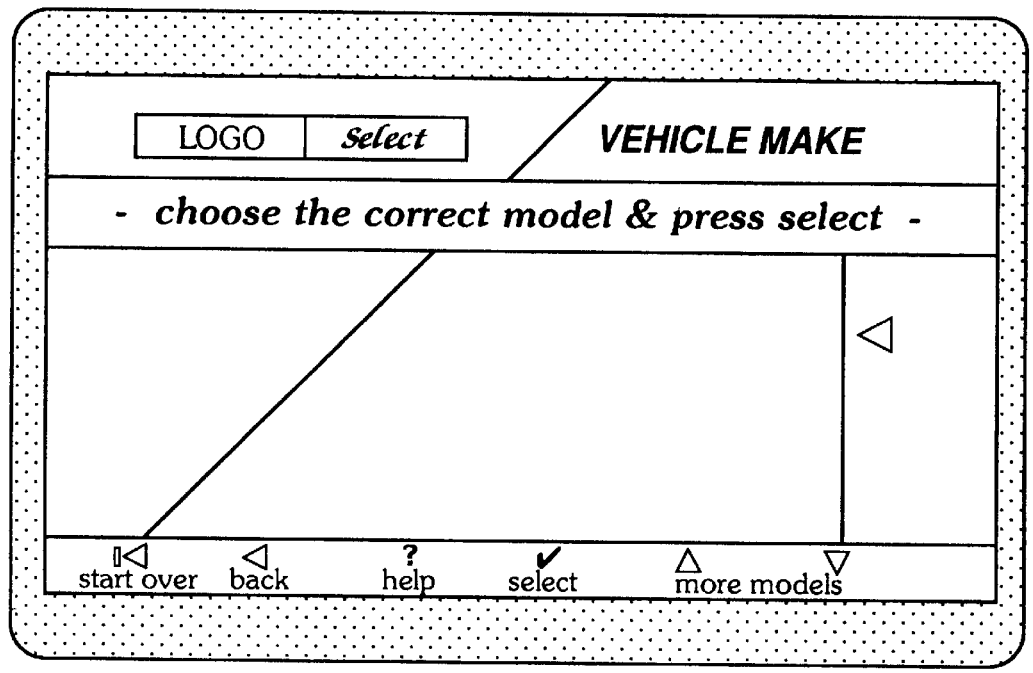
FIG. 3 is a view of a monitor screen used to select vehicle model.

At the retail outlet, the monitor 18 would present a screen display requesting a make and model of vehicle, as illustrated in FIGS. 2 and 3. In response to the selection of make and model, the monitor 18 presents a screen display portraying the various seat configurations installed as original equipment by the manufacturer in the selected model and requesting a selection of one of the various seat configurations portrayed on the monitor, as illustrated in FIG. 4. Thereafter, the monitor 18 presents a seat cover size on the monitor from the selection data base in response to the selection of one of the various seat configurations, as illustrated in FIG. 5.

Although the invention has been described in connection with seat covers, it is to be understood that the invention can be employed equally as effectively for other automotive components such as floor mats, seat cushions, cargo liners, and the like. Accordingly, the method is for sizing and distributing an automotive component which varies in configuration from model to model of vehicle and in its broadest sense comprises the steps of: creating a data base of the different configurations of the component installed as original equipment by the manufacturer in each model of various vehicle makes; developing a minimum number of component patterns with a component fabricated from each pattern designed to fit a group of the different component configurations and designated as a predetermined size for that group with different component patterns producing components fitting different groups; creating a selection data base assigning each of the component configurations to a predetermined size of component; fabricating a plurality of components in each predetermined size; presenting a screen display on a monitor portraying the various component configurations installed as original equipment by the manufacturer and requesting a selection of one of the various component configurations portrayed on the monitor; presenting a component size on the monitor from the selection data base in response to the selection of one of the various component configurations. Of course, the different configurations of the component installed as original equipment by the manufacturer is a male component in the case of seats whereas it is a female component in the case of the cargo bay.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A method of sizing and distributing an automotive component which varies in configuration from model to model of vehicle comprising the steps of:

creating a data base of the different configurations of the component installed as original equipment by the manufacturer in each model of various vehicle makes;

developing a minimum number of component patterns with a component fabricated from each pattern designed to fit a group of the different component configurations and designated as a predetermined size for that group with different component patterns producing components fitting different groups;

creating a selection data base assigning each of the component configurations to a predetermined size of component;

fabricating a plurality of components in each predetermined size;

presenting a screen display on a monitor portraying the various component configurations installed as original equipment by the manufacturer and requesting a selection of one of the various component configurations portrayed on the monitor;

presenting a component size on the monitor from the selection data base in response to the selection of one of the various component configurations.

2. A method of sizing and distributing automotive seat covers comprising the steps of:

creating a data base of different seat configurations installed as original equipment by the manufacturer in each model of various vehicle makes;

developing a minimum number of seat cover patterns with a seat cover fabricated from each pattern designated as a predetermined size and designed to fit a plurality of the different seat configurations;

creating a selection data base assigning each predetermined seat configurations to a predetermined size of seat cover;

fabricating a plurality of seat covers in each predetermined size in an array of different colors and fabrics;

presenting a screen display on a monitor portraying the various seat configurations installed as original equipment by the manufacturer and requesting a selection of one of the various seat configurations portrayed on the monitor;

presenting a seat cover size on the monitor from the selection data base in response to the selection of one of the various seat configurations.

3. A method as set forth in claim 2 further defined as presenting a first screen display on the monitor to request a selection of the make of vehicle.

4. A method as set forth in claim 3 further defined as presenting a second screen display on the monitor to request a selection of the model.

5. A method as set forth in claim 4 further defined as presenting a third screen display on the monitor to request a selection of the seat configuration.

6. A method as set forth in claim 5 further defined as presenting a fourth screen depicting the seat configuration selected and requesting verification.

7. A method as set forth in claim 6 further defined as presenting a fifth screen presenting a seat cover size in response to the verification of the seat configuration.

8. A method of packaging and distributing automotive seat covers comprising the steps of:

creating a data base of different seat configurations installed as original equipment by the manufacturer in each model of various vehicle makes;

developing a minimum number of seat cover patterns with a seat cover fabricated from each pattern designated as a predetermined size and designed to fit a plurality of the different seat configurations;

creating a selection data base assigning each of the seat configurations to a predetermined size of seat cover;

fabricating a plurality of seat covers in each predetermined size in an array of different colors and fabrics;

providing boxes of a plurality of different volumes with the boxes all presenting the identical rectangular shape on one side and varying in distance from the rectangular side to vary the volume from box to box for packaging seat covers of various different sizes;

packaging each predetermined size of seat cover in one of the boxes dependent upon the volume of the folded seat cover;

creating a geographical data base of numbers of vehicle models in a predetermined geographical area;

stocking a retail outlet in the predetermined geographical area with the number of each predetermined size of seat cover being proportional to the number of vehicle models in the geographical area as determined from the geographical data base;

presenting a screen display on a monitor in the retail outlet requesting a make and model of vehicle;

presenting a screen display on the monitor portraying the various seat configurations installed as original equipment by the manufacturer in the selected model and requesting a selection of one of the various seat configurations portrayed on the monitor;

presenting a seat cover size on the monitor from the selection data base in response to the selection of one of the various seat configurations.

9. An assembly for distributing an automotive component which varies in configuration from model to model of vehicle, said assembly comprising:

a computer having an input, a monitor output and a memory connection;

a monitor connected to said monitor output for presenting various screen displays;

a memory connected to said memory connection for storing various seat configurations installed as original equipment by the manufacturer in each model of various vehicle makes and assigning each of the seat configurations to a predetermined size of seat cover; and a selection device connected to said input for inputting selection signals to said computer in response to monitor presentations to select a specific seat configuration.

10. An assembly as set forth in claim 9 wherein said computer stores a first screen for display on the monitor to request a selection of the make of vehicle.

11. An assembly as set forth in claim 10 wherein said computer stores a second screen for display on the monitor requesting the model.

12. An assembly as set forth in claim 11 wherein said computer stores a third screen for display on the monitor requesting the seat configuration.

13. An assembly as set forth in claim 12 wherein said computer stores a fourth screen for display on the monitor presenting a seat cover size in response to the selection of the seat configuration.

14. An assembly as set forth in claim 9 including shelves and boxes disposed on said shelves, said boxes being of a plurality of different volumes with all of the boxes presenting the identical rectangular shape on one side and varying in distance from the rectangular side to vary the volume from box to box for packaging seat covers of various different sizes; each of said boxes having indicia indicating size thereon.

15. An assembly as set forth in claim 14 wherein said boxes have a common height and depth and vary in width along the shelves.

16. An assembly as set forth in claim 14 wherein said boxes have a common height and width along the shelves and vary in depth into the shelves.

17. An assembly as set forth in claim 14 wherein each of said boxes has an opening for viewing and touching the seat cover material disposed in the box.

* * * * *